United States Patent [19]

Schmider

[11] Patent Number: 4,501,983
[45] Date of Patent: Feb. 26, 1985

[54] ELECTRIC MACHINE

[75] Inventor: Fritz Schmider, Hornberg, Fed. Rep. of Germany

[73] Assignee: Papst Motoren KG, St. Georgen, Fed. Rep. of Germany

[21] Appl. No.: 249,339

[22] Filed: Mar. 31, 1981

Related U.S. Application Data

[63] Continuation of Ser. No. 928,885, Jul. 28, 1978, abandoned.

[30] Foreign Application Priority Data

Jan. 1, 1978 [DE] Fed. Rep. of Germany ....... 2803956

[51] Int. Cl.³ .............................................. H02K 47/04
[52] U.S. Cl. .................................. 310/113; 310/68 R; 310/75 R; 310/89; 310/154; 310/171; 310/242; 310/248
[58] Field of Search ......................... 310/229, 112–114, 310/157–171, 154, 68 R, 268, 89, 72, 127, 128, 239, 51, 219, 232, 242, 248, 249, 75 R; 307/105

[56] References Cited

U.S. PATENT DOCUMENTS

| | | | |
|---|---|---|---|
| 2,470,096 | 5/1949 | Eck | 307/105 |
| 3,419,957 | 1/1969 | Stone | 310/89 |
| 3,735,172 | 5/1973 | Battaglia | 310/239 |
| 3,739,211 | 10/1971 | Hasler | 310/171 |
| 3,790,832 | 2/1974 | Patel | 310/113 |
| 3,845,339 | 10/1974 | Merkle | 310/68 R |
| 3,924,147 | 12/1975 | Tarnow | 310/68 R |
| 4,112,321 | 9/1978 | Wan | 310/242 |
| 4,174,484 | 11/1979 | Schmider | 310/68 R |

FOREIGN PATENT DOCUMENTS

451862  8/1936  United Kingdom .................. 310/72

Primary Examiner—R. Skudy
Attorney, Agent, or Firm—Michael J. Striker

[57] ABSTRACT

The motor housing comprises a cup-shaped ferromagnetic part having an open end and an axial end plate of ferromagnetic material closing off the open end to form a motor housing of rectangular cross-section when viewed in longitudinal section. A generally disk-shaped rpm-signal generating structure is mounted interiorly of the motor housing, coaxial with the rotor axis, at one axial end of the housing, and just inward of a wall of the motor housing which forms part of the flux-conducting magnet system of the motor, whereby such wall shields the rpm-signal generating structure at least against electromagnetic interference originating exteriorly of the motor housing. The motor comprises slip rings or commutator segments on whose surfaces stationary brushes ride. The brushes are provided with longitudinal recesses, projections or internal bores, so that the brush configuration itself makes for longitudinal brush guidance, and the brushes are mounted on brush guide members which engage such longitudinal portions of the brush. The rotor shaft and the motor housing are conductively connected by means of a contact element engaging the rotor shaft at one axial end, to prevent build-up of electrostatic fields as between the rotor shaft and the motor housing.

21 Claims, 18 Drawing Figures

ELECTRIC MACHINE

This is a continuation of application Ser. No. 928,885, filed July 28, 1978, now abandoned.

BACKGROUND OF THE INVENTION

The present invention concerns electric machines, and especially drive motors for signal-processing equipment mainly adapted for slow-operation, such as tape recorders and the like.

Drive motors of the type in question are disclosed in U.S. Pat. 3,845,339 and in U.S. patent application Ser. No. 708,092, now U.S. Pat. No. 4,174,484. In addition to requirements concerning simple construction and axial compactness, when such motors are rpm-regulated there arises a further problem, involving the need to suppress the effect upon the motor's rpm-regulating circuit of external interference coming from outside the motor, e.g., coming from electronic components of the apparatus driven by the motor, coming from closely located transformers, and so forth. In order to generate the actual-rpm signal needed for negative-feedback regulation of rpm, use is conventionally made of a tachometer generator. The shielding required for the latter, in order to shield it from the interference emanating from neighboring components and from the drive motor itself, generally requires a considerable amount of expense.

SUMMARY OF THE INVENTION

One object of the invention is to provide a drive motor of the type in question, of economical design but such that the entire drive system exhibits the requisite axial compactness and minimal susceptibility of its actual-rpm signal-generating means to the effects of interference, especially from the equipment being driven.

If the machine has rotating windings connected to slip rings or commutators on which ride stationary brushes, then it is known to mount the round or polygonal brushes shiftably in stationary brush holders which surround the brushes like a sleeve. The brushes can also be connected to swingably arranged brush holders. In either case, the brushes springily bear upon the travelling surface of the slip ring or commutator. Common to these known constructions is the considerable mechanical expense needed for production and mounting of the brush holders, which can significantly add to the total cost of the motor, especially when small and miniature motors are involved.

Accordingly, it is a further object of the invention to make possible less expensive production and installation of the brush-holding means.

For machines used to drive phonographs, tape recorders, and the like, and especially where the machine is used for direct-drive, i.e., where the rotor shaft directly drive the turntable or in itself constitutes the capstan, there is frequently encountered the problem of electrostatic charge as between the motor housing and the rotor shaft. To deal with such electrostatic charging, it is chiefly known to insulate the rotor shaft relative to the housing by means of an oil film.

It is another object of the invention to provide a novel technique for preventing the development of electrostatic charge as between the rotor shaft and the motor housing.

In accordance with the invention, the drive motor has a cylindrical (radial) air gap, and the housing of the motor has an at least approximately rectangular configuration when viewed in longitudinal cross-section. The motor is provided with rpm-signal generating means. The rpm-signal generating means is coaxial with the motor proper, is of extremely short length measured in the axial direction, and has a radius only a little smaller than that of the motor housing. The rpm-signal generating means is arranged at one axial end of the motor housing, interiorly of the motor housing, and is located just inward of a wall which is magnetically conducting at least a part of the useful magnetic flux of the motor.

The inventive structural integration of the motor proper and its rpm-signal generating means makes for a drive which is particularly compact in the axial direction and rather inexpensively produced and assembled. The aforementioned wall of the motor housing, this wall magnetically conducting at least part of the useful motor flux, is necessarily relatively thick. Because the rpm-signal generating means is located interiorly of this wall, this wall, which is anyway a necessary structural component of the motor, now additionally serves to provide rather excellent shielding of the rpm-signal generating means.

If the drive motor is a collector motor, then preferably the brush structure is arranged at one axial side of the motor winding, with the rpm-signal generating means located at the opposite axial side of the motor winding. A particularly simple and compact structure results, if there are formed within the brushes themselves at least one guide element for longitudinal guidance of the brushes, making possible a brush holder structure which is of simple construction, easy to produce and easy to install.

In view of the objects referred to above, the rpm-signal generating means preferably is located very closely axially adjacent to the motor winding, between the latter and the axial end plate of the motor housing. Advantageously, the rpm-signal generating means is designed as disclosed in commonly owned U.S. patent application Ser. No. 708,092, now U.S. Pat. No. 4,174,484 referred to above, of the same inventor as herein, entitled "MOTOR WITH A DISK ROTOR," the entire disclosure of which is herein incorporated by reference. Reference may be had to that commonly owned application for details.

To minimize the effect upon the rpm-signal generating means of interference emanating from the motor itself, the rpm-signal generating means has the form of a tachometer generator including an induction coil oriented perpendicular to the motor shaft, and the magnetic flux of the motor is conducted, in the region of such induction coil, in a direction parallel to the longitudinal axis of the induction coil.

To prevent the development of electrostatic charging as between the motor housing and motor shaft, there is provided at least one electrical contact element which springily presses against the rotor shaft and is conductively connected with the motor housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
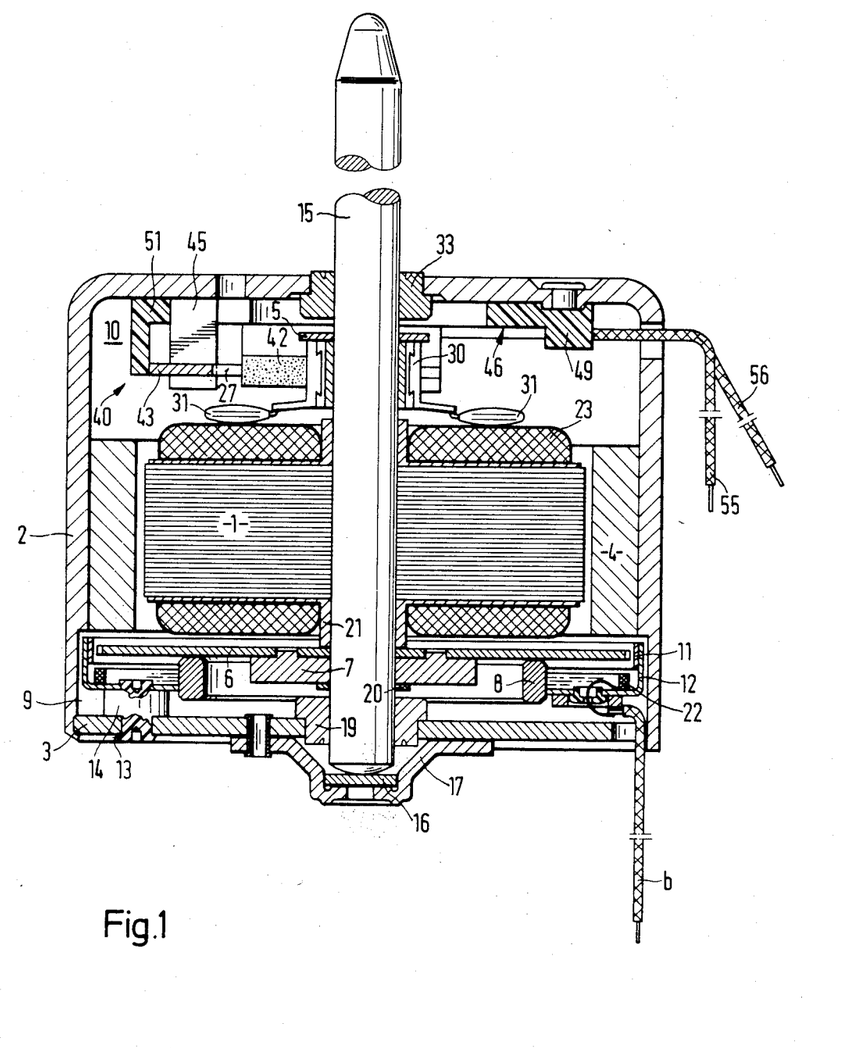
FIG. 1 is a longitudinal section through a first embodiment of an inventive drive motor.
Figure 2:
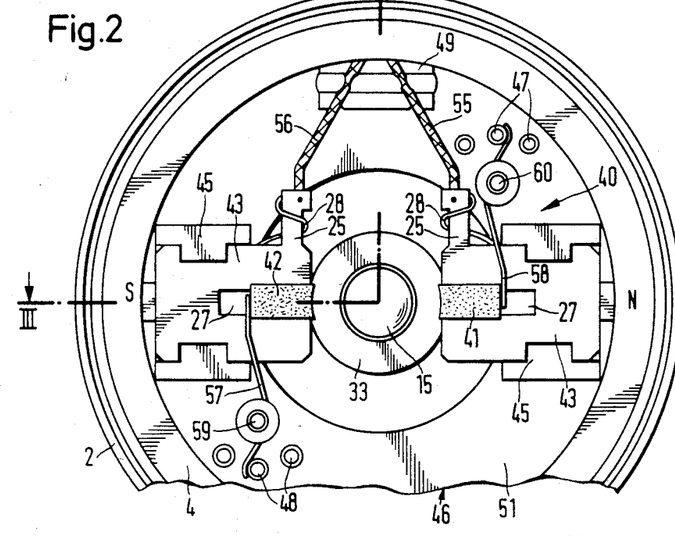
FIG. 2 is an axial view of the axially compact brush arrangement of the drive motor of FIG. 1, the brush arrangement being located at the base of the cup-shaped part of the motor housing.
Figure 3:
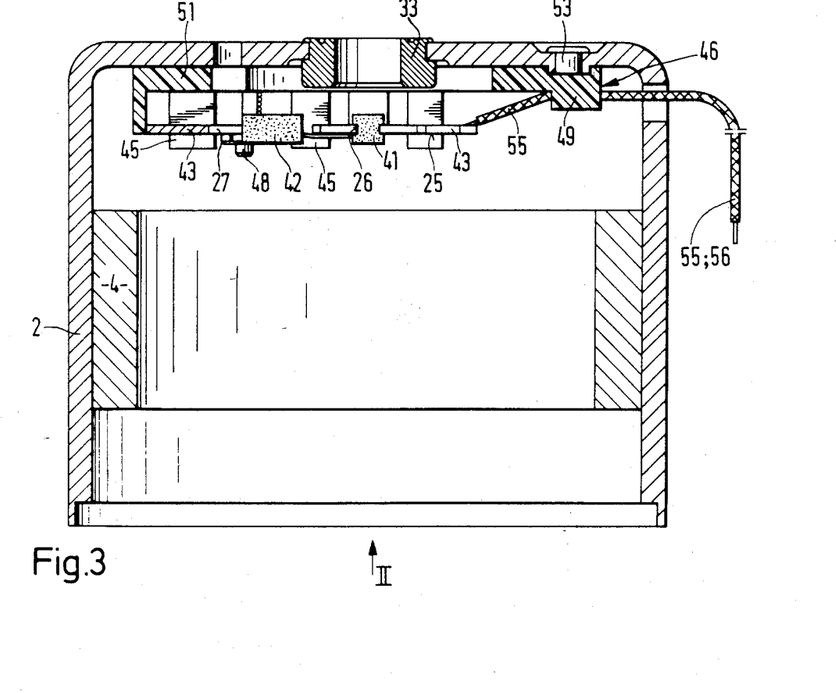
FIG. 3 is a section taken along line III—III of FIG. 2.

The drive motor depicted in FIGS. 1-3 comprises a stack of rotor plates 1, a rotor winding 23, and permanent-magnet stator magnets 4. The drive motor is a collector motor, with a cylindrical (radial) air gap. The motor proper and its tachometer generator are provided in a motor housing. The motor housing comprises a deep-drawn cup-shaped housing part 2 of soft magnetic material. The open end of the cup-shaped housing part 2 is closed off by an axial end plate 3, likewise made of soft magnetic material. The stack of rotor plates 1 and the rotor winding 23 are mounted on a shaft 15 which is journalled in flanged journals 19, 33 of which one is inserted in end plate 3 and the other in the base of the cup-shaped housing part 2.

Figure 1A:
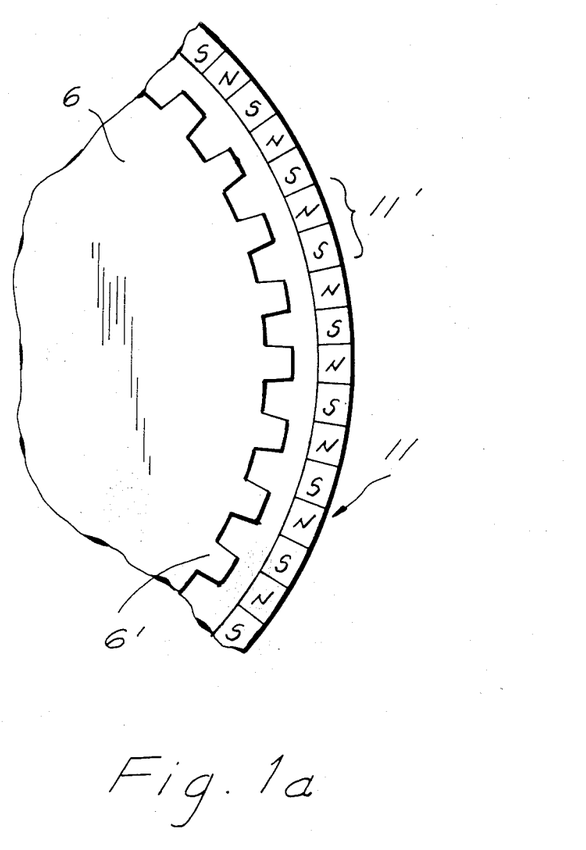
FIG. 1a is a plan view of a cut away part of rotor disk 6 and magnetic strip 11 in FIG. 1.

The tachometer generator comprises a thin, ferromagnetic rotor disk 6 which is provided with a circumferential succession of teeth. The rotor disk 6 is rigidly connected to shaft 15, through the intermediary of a preferably non-ferromagnetic carrier member 7. Connected to the rotor disk 6 is an annular soft iron member 8 of smaller diameter than that of disk 6 but having an axial length several times that of the rotor disk 6. At the region 9 of the cup-shaped housing part 2, the inner periphery of housing part 2 is machined out to have a larger internal diameter. Extending into region 9 is the cylindrical wall of a cup-shaped soft-iron drawn member 12. The bottom wall of member 12 is formed with a central opening to accommodate the rotary annular soft-iron member 8. In the region of the open end of cup-shaped member 12, i.e., the end which faces towards motor winding 23, the inner periphery of the cylindrical wall of member 12 is lined with a magnetic strip 11 surrounding the circumference of the toothed rotor disk 6. As indicated in FIG. 1a, magnetic strip 11 comprises 200 pairs of oppositely polarized magnetized sectors 11, i.e., 200 pole pairs, the magnetic polarity N and S of the successive magnetized sectors alternating as one proceeds along the length of strip 11, i.e., proceeding along the inner periphery of the cylindrical wall of member 12. The number of teeth 6 on rotor disk 6 corresponds to the number of pole pairs of magnetic strip 11. Arranged around the opening at the bottom of drawn soft-iron member 12 is a stationary annular coil 22, from which is located below the rotary disk 6 in proximity to the teeth thereof and which shielded connecting conductors b extend out to the exterior of the motor. The coil 22 during rotation of the motor generates by induction the actual rpm-signal. The drawn soft-iron member 12 is connected to the axial end plate 3 of the housing via thermoplastic spacing members 14. Spacing members 14 have heads 13 which extend through openings in plate 3 and member 12 and terminate in flanges extending radially outward beyond the rims of such openings, for secure mounting.

In FIGS. 1 and 3, the rotor shaft 15 is vertical and is supported on an end-support plate 16, the latter being held in a carrier 17 riveted to the motor-housing end plate 3. The rotary part 6, 7, 8 of the tachometer generator is held in place axially on rotor shaft 15, between an end disk 21 of the rotor winding and a disk 20 pushed onto the rotor shaft.

The collector 30 of the motor cooperates with a brush arrangement 40 provided in a space 10 at the side of the rotor 1, 23 which faces away from the tachometer generator. The anti-interference capacitors associated with the collector are shown at 31.

Figure 8:
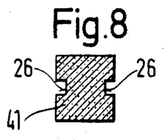
FIG. 8 is an enlarged-scale cross-section through a brush of the type provided in FIGS. 2, 3, 5 and 6.

As shown in detail in FIGS. 2, 3 and 8, the brush arrangement 40 comprises brushes 41, 42, which latter are guided, by means of guide elements in the form of lateral grooves 26 extending in the direction of elongation of the brushes, in the cut-outs 27 of U-shaped guide member 43. The guide members 43 can advantageously be stamped sheet-metal components, made for example of brass. The dimensions of the cut-outs 27 and the thickness of the guide members 43 are so matched relative to the rectangular grooves 26 of the brushes 41, 42, that the brushes are shiftable in the direction towards the cylindrical collector 30 with very little axial and radial play.

The guide members 43 are in turn held by an annular brush carrier 46. Brush carrier 46 comprises shaped elements 45, each of which engages a respective guide member 43 from both sides. The brush carrier 46 is preferably a vibration-damping synthetic plastic member. Secured on the brush carrier 46 are two groups 47, 48 of three pins each. In each such group of three pins 47, 48, one end of a respective torsion spring 57 or 58 is braced against a selected one of the three pins. The middle part of each torsion spring is slung around a respective pin 59 or 60 secured to the brush carrier 46. The other end of each torsion spring bears against the radially outermost end face of a respective one of the brushes 41, 42, as a result of which the brushes are spring biased in the direction to collector 30 with an adjustable amount of spring force. The base part 51 of the brush carrier 46 is connected with the base of the cup-shaped housing part 2 via pins 53 which project upwards past the brush carrier. The pins 53 are heated and then peened over to secure brush carrier 46 to cup-shaped housing part 2. An oil-flinging disk 5 is secured to shaft 15 above the collector 30, to prevent the collector from being contacted with the oil serving to lubricate the bearing 33.

The supply of current to the brushes 41, 42 is implemented via connecting cables 55, 56, which latter are held tension-free in a thermoplastically formed projection 49 of the brush carrier 46, and additionally via contact strips 28 extending out from the brushes. The cables 55, 56 and the contact strips 28 are conductively connected to one another via connecting lugs 25.

The tachometer generator is effectively shielded by motor housing 2, 3 against electromagnetic interference. Because the brush arrangement 40 is located at the side of the motor opposite the tachometer generator, and because the magnetic flux of the motor in the region of the induction coil 22 of the tachometer generator extends parallel to the axis of coil 22, the effect of electromagnetic interference emanating from the motor 20 proper is kept minimal. Contributing to this shielding effect is the fact that carrier member 7 is made of non-ferromagnetic material. The structure as a whole has only a short axial length. Structural complexity, and accordingly cost, are kept quite low.

Figure 4:
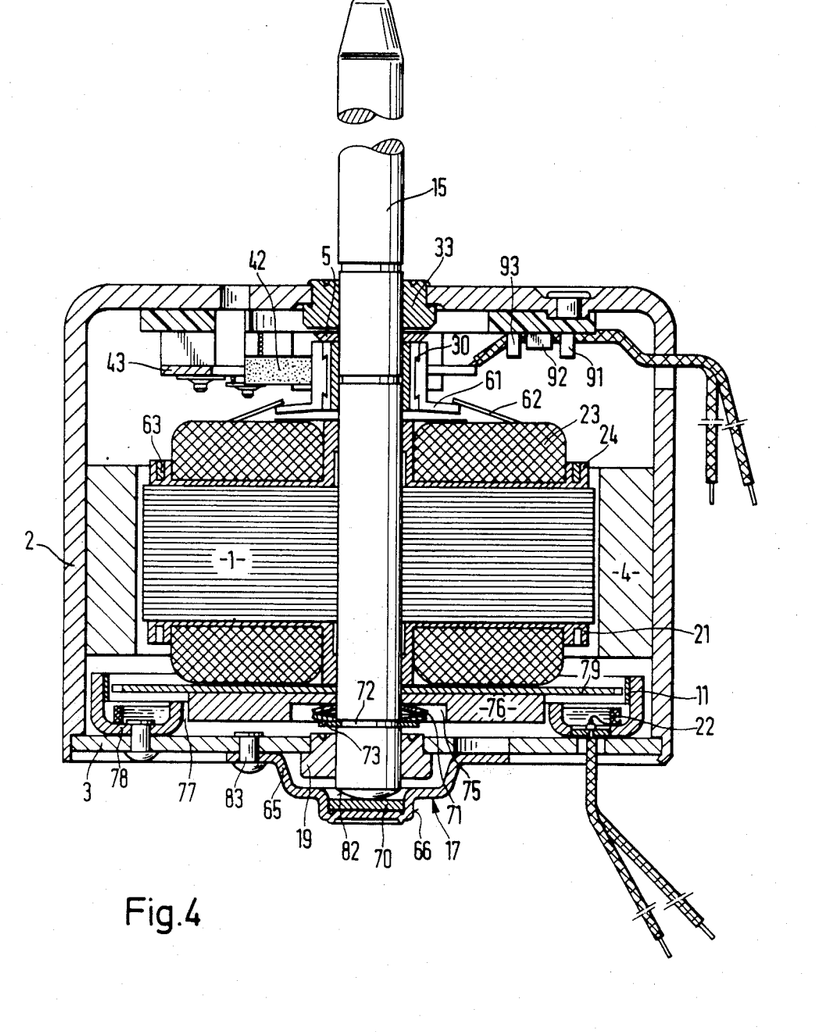
FIG. 4 is a longitudinal section through a second embodiment of the inventive drive motor.
Figure 5:
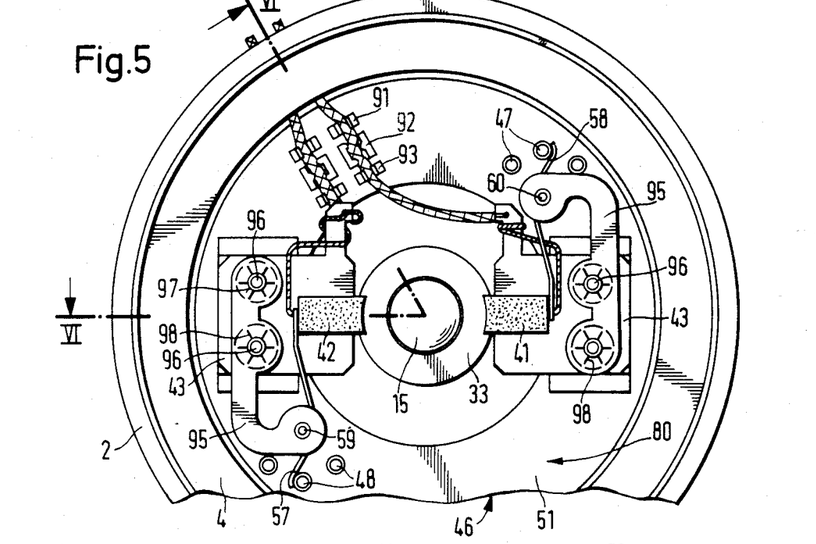
FIG. 5 is an axial view of the brush arrangement of the motor of FIG. 4.
Figure 6:
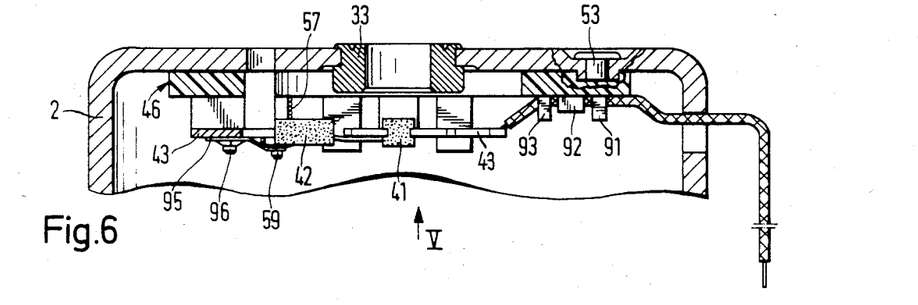
FIG. 6 is a section taken along line VI—VI of FIG. 5.

The embodiment depicted in FIGS. 4-6 is of even more compact construction, as considered in the axial direction. Contributing to this is the fact that the stationary flux guide member 78 of the tachometer generator is located immediately adjacent to the motor housing end plate 3, riveted thereto. The toothed rotor disk 79 of the tachometer generator is connected to a soft ferromagnetic member 76 whose circumferential surface, together with the radially inward leg of the U-shaped flux guide member 78 as seen in cross-section, bounds a cylindrical air gap 77 which is coaxial with the motor axis.

An annular spring 73 is seated in an annular recess 72 of the rotor shaft 15. The soft magnetic member 76 is provided with an axial recess 75. Recess 75 accomodates a plate or leaf spring 71, which is braced against the annular spring 73 and against the bottom of the axial recess 75. As a result, the leaf spring 71 holds the rotating part 76, 79 of the tachometer generator supported against the end plate 21 and the motor winding 23.

In other respects, the construction and operation of the tachometer generator corresponds to that of the embodiment depicted in FIGS. 1-3.

The brush arrangement 80 at the other axial end of the motor winding likewise for the most part resembles the brush arrangement 40 of the first embodiment. The guide members 43 and the springs 57, 58 are held by thin stamped-out sheet-metal members 95 which are pushed onto pins 96 of the brush carrier 36 as well as onto pins 59, 60. In the region of the pins 96, the stamped-out sheet-metal members 95 are provided with openings 97 having a diameter somewhat smaller than the diameter of the pins. A plurality of slits 98 extend radially out from each of these openings 97. When the stamped-out sheet-metal members 95 are pushed into place, the slits 98 make for an enlarging of the openings 97 up to the diameter of the pins 96, as a result of which the members 95 are fixedly clamped on the pins 96. The connecting cables are fed out through a labyrinth guide structure 91, 92, 93 provided on the brush carrier 46, for tension-relief, i.e., to assure that any pull on these cables from the exterior of the motor cannot be communicated to the interior of the motor.

In order to even further decrease the axial length of the construction, the anti-interference capacitors 31 of the first embodiment are here accommodated within recesses 1' in the stack of rotor plates 1. The capacitors are inserted into the stack of rotor plates from the upper axial end of the stack 1, as viewed in FIG. 4. They have diameters slightly larger than the width of these recesses or grooves 1', in order to secure these capacitors from falling out. The first terminal conductors 62 of these anti-interference capacitors are conductively connected to respective projections 61 of the collector segments, whereas the respective second terminal conductors (non-illustrated) of these capacitors are conductively connected to an electrically conductive ring 63, which latter is inserted into the upper end plate 24 of the rotor winding.

If desired, the guide members 43 can also be made of insulating material, for example plastic-impregnated fabric; or they can constitute the circuit boards or support members for printed circuitry which, if desired, can include anti-interference components or other circuit elements.

Figure 9:
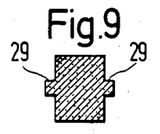
FIGS. 9 and 10 are views similar to FIG. 8 of other brush configurations.

Other forms of brush guide structures are possible, such as round, polygonal, pin or bolt-shaped, which engage into or on the guide elements of the brushes or have the form of springy bent-wire members. For example, FIG. 9 depicts a brush cross-section in which the guide elements of the brush have the form of two longitudinal ribs 29, whereas in FIG. 10 the guide elements of the brush have the form of two longitudinally extending setbacks 32 located at opposite sides of the brush. In the latter case, the brush can for example be engaged at its top face by a leaf-spring type element and be pressed by the latter against a stationary guide structure complementary to the setbacks 32, to establish the requisite sliding guidance of the brush in this manner.

If the currents flowing through the brushes are only relatively small, then if the surface area of the brushes across which such current flows is relatively large, i.e., if the area of surface contact between such brushes and the electrically conductive guide members and/or electrically conductive leaf-spring type members is relatively large, then one can dispense with the contact strips 28.

With smaller electric machines, the lifetime of the brushes is matched to the expected lifetime of the machine. However, if brush replacement is to be made possible, then the guide members 43 are each advantageously designed of two-part construction, in order to be able to insert the brushes from the side facing away from the collector 30.

The use of polyamide for the brush carrier 46 reduces the generation of noise, due to its good vibration-damping properties. Alternatively, or in addition thereto, one can resort to a vibration-damping assembly of the slide guide structures for the brushes achieved by appropriate configuring of the form elements 45 and/or of the holding parts 95.

Figure 10:
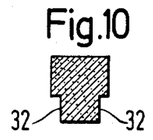
Figure 11:
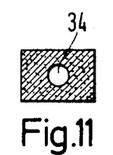
FIGS. 11-13 are cross-sections corresponding to FIGS. 8-10 through brushes provided with internal guide means.
Figure 12:
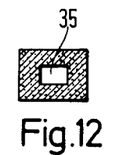
Figure 13:
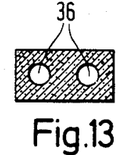

Whereas in FIGS. 8-10 the guide elements (recesses or projections) of the brushes are provided on the exterior of the brushes, in FIGS. 11-13, the brushes are provided with interior guide elements 34, 35, 36 in the form of blind or throughgoing bores which extend in the direction in which the brushes are to be slidable. In each of these cases, these interior guide elements are advantageously formed at the time the starting material for the brush is being molded into shape. The embodiments shown in FIGS. 12 and 13, wherein the guide elements have the form of a rectangular opening or of two parallel openings, additionally serve to assure that the surface of the brush contacting the collector or slip ring is prevented from turning. As a result, the means mounting the brushes in place can be kept especially simple.

Figure 14:
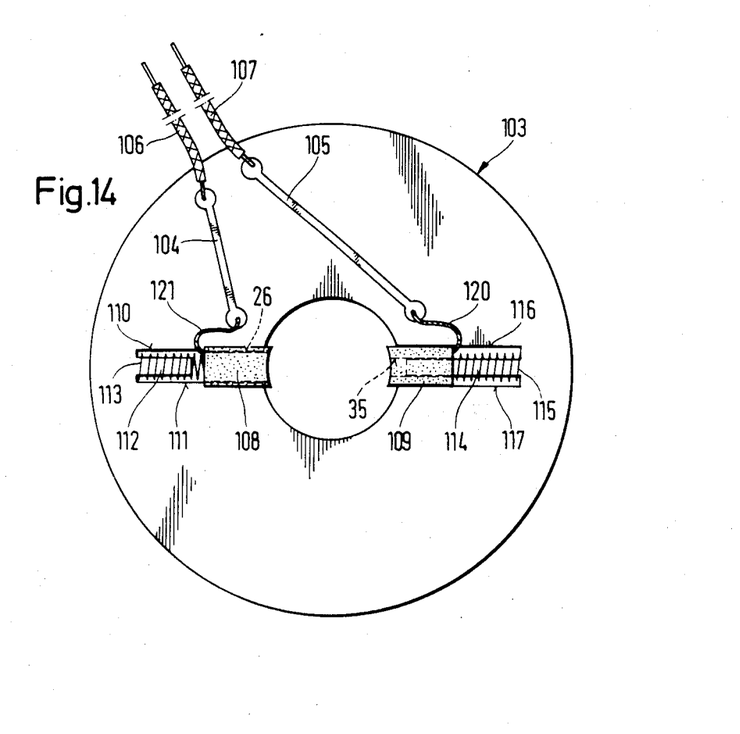
FIG. 14 is an axial view of a further modified brush arrangement.

According to another concept of the invention, the discrete guide members such as 43 in FIGS. 2 and 5 can be dispensed with, and instead the brush carrier can itself be a one-piece member of insulating material configured complementary to the form of the guide elements (recesses, projections and/or internal bores) of the brushes, so as to itself serve to establish the requisite sliding guidance for the brushes. Such an embodiment is depicted in FIG. 14. Here, the brush carrier 103 is designed as a carrier for printed circuitry. The circuit components on brush carrier 103 are not depicted, except for the conductive paths 104, 105 which conductively connect the connecting cables 106, 107 to the brushes 108, 109 via contact strips 120, 121. The two brushes shown in FIG. 14 are differently held and guided. Brush 108 corresponds to the brush shown in FIG. 8. Its guide elements 26 slide along the edges 110, 111 of a stamped cut-out in the brush carrier, in which extends a spring mounting element 112. Mounted on the latter is a helical compression spring 113 which presses the brush 108 in the direction towards the collector. The brush 109 corresponds to that shown in FIG. 12 and has an interior rectangular guide element 35, into which a brush guide projection 114 extends, the latter additionally serving to mount a helical compression spring 115. The edges 116, 117 of the stamped cut-out smoothly adjoin the side faces of the brush 109 and thereby advantageously contribute to the guidance of the brush 109.

In the embodiments shown in FIGS. 1 and 4 the annular coil 22, preferably made of baked lacquer wire, is provided in direct contact with the bottom of the flux guide structure 12 or 78, preferably cemented to the latter. In contrast, in the embodiment of FIG. 7, the annular coil 22 is supported on a coil former 64 which, in turn, is connected to the flux guide member 78. The coil former 64 structurally stabilizes the coil 22 and facilitates its installation during assembly.

Figure 7:
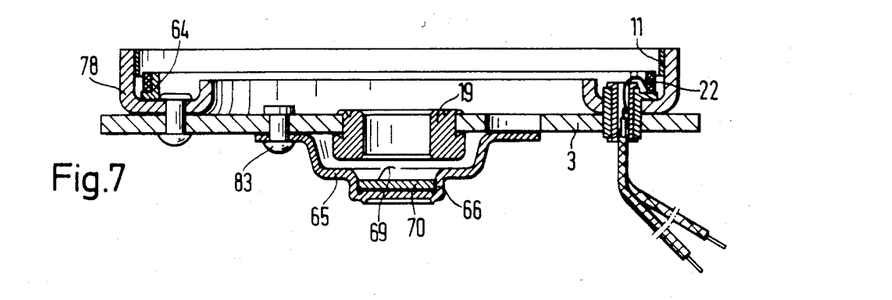
FIG. 7 is an axial section through the flat axial end plate of the housing of a drive motor similar to that shown in FIG. 4, provided with a riveted-on tachometer generator.
Figure 15:
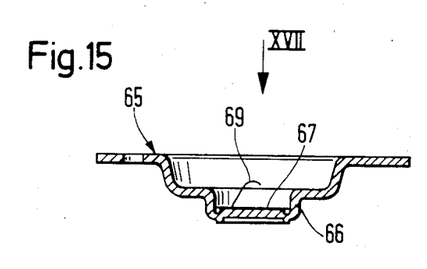
FIG. 15 is an axial section through the rotor-shaft bearing flange used in FIG. 7.
Figure 16:
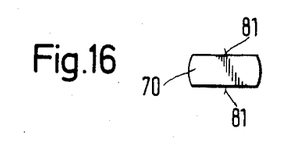
FIG. 16 depicts the end-support plate used in FIG. 7 for bearing the axial end of the rotor shaft.
Figure 17:
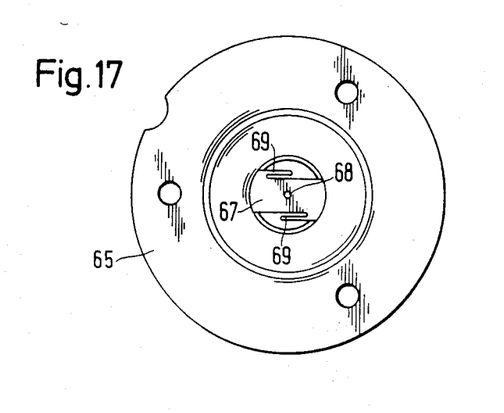
FIG. 17 is an axial view of the bearing flange shown in FIG. 15.

In the structure of FIG. 7, and as most clearly shown in FIGS. 15–17, the axial end support 65, made of electrically conductive material, has a central projecting portion 66 into which is inserted an electrically conductive spring disk 67. The thin spring disk is conductively connected to the axial end support 65 by a weld indicated at 68. The spring disk 67 is of mirror-symmetrical configuration and comprises two upwardly bent contact arms 69. Inserted into the recess 66 of axial end support 65, above the spring disk 67, is a plate-shaped axial end bearing member 70. The longer dimension of member 70 matches the inner diameter of the projecting portion 66, whereas the sides of the axial end bearing member 70 are flattened off as indicated at 81, to permit the contact arms 69 to extend upwards through the spaces between the flattened-off sides 81 and the inner wall of the axial end support member 65. The axial end bearing member 70 is preferably made of synthetic plastic which presents extremely low friction. It forms an axial bearing for the shaft 15 whose convex axial end 82 rests upon the axial end bearing member 70 (FIG. 4). The contact arms 69 press against the convex end face 82 of rotor shaft 15 at locations near the rotation axis of the latter. Accordingly, the rotor shaft 15 and the motor housing 2, 3 are conductively connected to each other, via the axial end support member 65, the electrically conductive rivets 83 and the motor housing end plate 3. This effectively prevents the build-up of electrostatic fields as between the motor shaft 15 and the motor housing 2, 3. Even if the lubricating oil in the region of the bearings 19, 33 establishes electrical insulation as between the shaft 15 and the motor housing 2, 3, this oil film is penetrated by the thin contact arms 69. Electrostatic charge building up is accordingly reliably conducted away and dissipated. Because the contact arms 69 engage the shaft at locations near to the rotation axis thereof, the braking moment exerted upon shaft 15 by the contact arms 69 is negligibly small. The wear experienced by the contact arms 69 is minimal.

Instead of the spring disk 67 with its contact arms 69, use can for example be made of a thin wire welded to the axial end support member 65. The spring disk 67, however, makes for easier assembly. Because two contact arms 69 are provided, conductive connection between the motor shaft and motor housing is assured, even if one of the contact arms looses engagement with the motor shaft, e.g., due to faulty assembly or during installation of the drive motor. It will be understood that, alternatively, the motor housing end plate 3 and the axial end support member 65 can be portions of a single piece of material. The convex end face 82 of the motor shaft 15 could also be constituted by making the end face 82 spherically concave and by inserting a ball bearing or the like therein.

The drive motors described above can for example be designed as five-strand collector motors for upright installation, in order for example to directly drive a phonograph turntable. If the motor is to be used to drive a tape machine, the motor shaft 15 can itself constitute the capstan of the tape machine.

It will be understood that each of the elements described above, or two or more together, may also find a useful application in other types of constructions differing from the types described above.

While the invention has been illustrated and described as embodied in drive motors of particular type provided with rpm-signal generating means of particular type it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electric drive motor for signal processing equipment comprising a stator and a rotor together forming a cylindrical radial air gap, a stationary motor housing of generally cylindrical configuration, said motor housing being made of soft magnetic material and serving as part of the magnetic circuit of the motor, brush means located between one axial end of said motor housing and said rotor; a separate flux guide member of generally cylindrical configuration mounted in the interior of the motor housing between the other axial end thereof and said rotor coaxial with the rotation axis of the latter, and having a diameter slightly smaller than the diameter of the motor housing and being of a magnetically soft material; rpm-signal generating means located in the flux guide member part to be shielded at least from electromagnetic interference originating exteriorly of the motor housing; the rpm-signal generating means including a relatively thin ferromagnetic rotor disk connected to the rotor coaxially with the axis of rotation thereof and having a plurality of teeth on its circumference, a stationary ring surrounding said rotor disk and being formed with a number of permanent magnetic pole pairs of opposite pole polarity and corresponding to the number of teeth on the rotor disk, and a stationary inductive coil arranged coaxially with the axis of rotation of said rotor in proximity to the path of movement of the teeth of the rotor disk to generate rpm signals.

2. An electric drive motor as claimed in claim 1 further comprising a soft-iron ring connected to the rotor disk coaxially with the axis of rotation thereof, and said inductive coil surrounding said soft-iron ring.

3. An electric drive motor as defined in claim 2 wherein said ferromagnetic rotor disk is connected to the rotor by means of a carrier disk of a magnetically non-conductive material.

4. An electric drive motor as defined in claim 3, wherein said flux guide member part has a cup-shaped configuration defining a magnetic flux-conducting cylindrical wall enclosing said inductive coil and a bottom wall formed with a central opening for accommodating the rotary soft-iron ring connected to the rotor disk.

5. An electric drive motor as defined in claim 1 wherein said rotor comprises a stack of rotor plates, the stack of rotor plates including recesses, the motor furthermore comprising anti-interference circuit components accommodated within the recesses in the stack of rotor plates.

6. An electric drive motor as defined in claim 1 wherein the flux guide member part has a cup-shaped configuration of deep-drawn soft-iron material, an inner wall portion of the motor housing being formed with a peripheral recess for accommodating said flux guide member part.

7. An electric drive motor as defined in claim 6 wherein said stator includes permanent magnets secured to the inner wall of said motor housing in proximity to said recess portion.

8. An electric drive motor as defined in claim 7 further comprising electrically insulating spacers for supporting said cup-shaped flux guide member part.

9. An electric drive motor as defined in claim 8 wherein said motor is constituted by a deep-drawn cup-shaped part of soft magnetic material having a base and an open end, and an axial end plate closing off the open end of the cup-shaped part and likewise made of soft magnetic material.

10. An electric drive motor as defined in claim 1 wherein said rotor comprising around rotor and further a cylindrical collector arranged for joint rotation with said rotor; said brush means including elongated stationary brushes riding upon the surface of the collector; means mounting the brushes for sliding movement in the direction of elongation of the brushes, a vibration-damping brush carrier mounted in the interior of the motor housing, and each of the brushes being configured to have two longitudinally extending lateral grooves of rectangular cross-section located at opposite sides of each of the brushes, the means mounting each of the brushes comprising a stamped, sheet-metal component mounted on the brush carrier and defining two guide portions engaging in respective ones of the lateral grooves for guiding of each of the brushes for movement in the direction of elongation each of the brushes.

11. An electric drive motor as defined in claim 1, wherein said motor housing is of electrically conductive material, said rotor being arranged for rotation within the motor housing and including a rotor shaft an end portion of which extends exteriorly of the motor housing, a support structure of electrically conductive material mounted on the motor housing and supporting said exterior end portion of the rotor shaft, and an electrically conductive contact element springily pressing against the face of the exterior end portion of the rotor shaft and conductively connected to the motor housing serving to present the build-up of electrostatic fields between the rotor shaft and motor housing.

12. An electric drive motor as defined in claim 11, the end portion of the rotor shaft which is supported on the exterior end portion of the rotor shaft which is supported on the support structure having a convex end face, the electrically conductive contact element pressing against the convex end face.

13. An electric drive motor as defined in claim 12, the contact element pressing against the convex end face of the rotor shaft at a location near the rotation axis of the rotor shaft.

14. An electric drive motor as defined in claim 1, wherein said rotor a wound rotor and further comprising a cylindrical collector arranged for joint rotation with said rotor; said brush means including elongated stationary brushes riding upon the surface of the collector; means mounting the brushes for sliding movement in the direction of elongation of the brushes, each of the brushes having a configuration which includes a longitudinal guidance portion cooperating with the mounting means for establishing the longitudinal guidance path of each of the brushes, said longitudinal guidance portion of each of the brushes comprising a recess extending longitudinally in at least one lateral side of each of the brushes, and the means mounting the brushes for sliding movement comprising a printed circuit carrier board configured to engage the longitudinal guidance portion of each of the brushes.

15. An electric drive motor as defined in claim 14, each of the brushes being configured to have two longitudinally extending lateral grooves of rectangular cross-section located at opposite sides of each of the brushes, the printed circuit carrier board comprising two edge portions for guiding each of the brushes for movement in the direction of elongation thereof.

16. An electric drive motor as defined in claim 14, the printed circuit board being a synthetic plastic molded member made of vibration-damping polyamide material.

17. An electric drive motor as defined in claim 14, the electrical current flowing through the brushes flowing through the longitudinal guidance portion of the brush and the means mounting the brushes being made of electrically conductive material.

18. An electric drive motor as defined in claim 14, the means mounting the brushes for sliding movement including a spring holder extending in the direction of elongation of each of the brushes and a biasing spring held on the spring holder and urging the brush in the direction towards the collector.

19. An electric drive motor as defined in claim 14, the means mounting the brushes for sliding movement including a spring holding structure and a biasing spring held on the spring holding structure for urging the brushes in the direction towards the collector and a brush holder mounted on the spring holding structure.

20. An electric drive motor as defined in claim 1, wherein said rotor is a wound rotor and further comprising a cylindrical collector arranged for joint rotation with said rotor; said brush means including elongated stationary brushes riding upon the surface of the collector; means mounting the brushes for sliding movement in the direction of elongation of the brushes, each of the brushes having a configuration which includes a longitudinal guidance portion cooperating with the mounting means for establishing the longitudinal guidance path of each the brushes, said longitudinal guidance portion of the brushes comprising a projection extending longitudinally on at least one lateral side of each of the brushes, and the means mounting the brushes including a recessed guide portion engaging the projection on each the brushes.

21. An electric drive motor as defined in claim 20, the means mounting each of the brushes comprising a guide member made of metal and having a connecting lug, further including a contact strip and connecting cables conductively connected to the connecting lug and to each of the brushes.

* * * * *